United States Patent Office 2,808,403
Patented Oct. 1, 1957

2,808,403

PURIFICATION OF D(−)GALACTAMINE

Fred Kagan, Kalamazoo Township, Kalamazoo County, Mich., assignor to The Upjohn Company, Kalamazoo, Mich., a corporation of Michigan No Drawing. Application February 21, 1955, Serial No. 489,739

12 Claims. (Cl. 260—211)

The present invention relates to a novel process for the production of pure D(−)galactamine and to novel compounds produced therein. More particularly, the invention is concerned with the utilization of aldehyde-galactamine condensation products, of the kind described below, in a novel process for the purification of crude D(−)galactamine. The invention is also concerned with certain novel aldehyde-galactamine condensation products which are useful in said D(−)galactamine purification process.

D(−)galactamine, in a purified state, is utilized in the resolution of racemic α-hydroxy-β,β-dimethyl-γ-butyrolactone (pantolactone), an important intermediate in the preparation of physiologically active pantothenic acid and salts thereof.

The resolution of the racemic pantolactone is carried out by reacting the racemic lactone with D(−)galactamine to produce the novel diastereoisomers, (−)-N-D-dulcityl-L-(α,γ-dihydroxy-β,β-dimethylbutyramide) and (+)-N-D-dulcityl-D-(α,γ-dihydroxy-β,β-dimethylbutyramide), recovering the (+)diastereoisomer by a conventional procedure, e. g., fractional crystallization, and hydrolyzing the (+)isomer to produce the desirable D(−)pantolactone.

The D(−)pantolactone is coupled with β-alanine or a salt thereof to produce D(+)pantothenic acid or salts thereof.

In the present process, purified D(−)galactamine is obtained by reacting crude or impure D(−)galactamine with an aromatic aldehyde in the presence of an inert solvent to produce the corresponding aldehyde-galactamine (i. e. the Schiff base produced along with water by the condensation of equimolar amounts of the primary amine and the aromatic aldehyde), separating the aldehyde-galactamine, hydrolyzing the aldehyde-galactamine to produce purified D(−)galactamine and the corresponding aldehyde, and recovering the purified D(−)galactamine.

D(−)galactamine can be prepared by the process disclosed by Holly et al., J. Am. Chem. Soc. 72, 5416 (1950), but the product produced by this process is not suitable for use in resolving racemic pantolactone without further purification, e. g., by the process of the present invention. The disclosed process broadly consists in reacting D(+)galactose with ammonia in the presence of hydrogen and a nickel catalyst to produce crude D(−)galactamine, apparently followed by the recrystallization of the crude to produce D(−)galactamine reported to be only 83 percent pure. This degree of purity is not satisfactory for the resolution of pantolactone. The low purity of the D(−)galactamine can reasonably be ascribed to side-reactions which occur during the aforesaid reductive amination of D(+)galactose. Thus the reaction mixtures obtained from such reductive aminations are quite complex, and can include not only the desired D(−)galactamine but also, inter alia, various water-soluble compounds such as dulcitol, didulcitylamine ("digalactamine"), as well as compounds such as ethylenediamine which are formed by cleavage reactions, and various other polyamino compounds derived from D(+)galactose. During the research which lead to the present invention, dulcitol, didulcitylamine and ethylenediamine have been identified in substantial amounts in such reaction mixtures, and potentiometric titration has strongly indicated the presence of other polyamino compounds derived from D(+)galactose. The solubility characteristics of the various components of such mixtures complicate the separation of the undesired by-products from the desired D(−)galactamine to such an extent that conventional procedures, e. g., recrystallization, are inadequate for the preparation of D(−)galactamine of good purity.

It has now been discovered, in accordance with the present invention, that impure or crude D(−)galactamine can be purified to such an extent that the resulting product is completely satisfactory for various purposes, e. g., for the resolution described above. The present process is adapted to the purification of impure D(−)galactamine prepared by any known procedure and is particularly adapted to the purification of impure D(−)galactamine prepared by the catalytic reductive amination of D(+)-galactose, such as the reaction of D(+)galactose with ammonia in the presence of hydrogen and a base-metal or noble-metal catalyst, e. g., nickel or platinum, wherein the numerous by-products provide major obstacles to the attainment of purified D(−)galactamine by conventional procedures.

Roux [Annales de Chimie et de Physique, vol. [8] 1, 142 (1904)], has reported the preparation of benzal-galactamine (benzylidene galactamine) which he accomplished by heating a mixture of benzaldehyde and D(−)-galactamine to about 180 degrees centigrade, cooling, adding the cooled mixture to 95 percent alcohol, permitting the alcoholic mixture to stand for several hours, and recovering the resulting benzylidene galactamine precipitate by filtration. Additionally, he used hot water to hydrolyze benzylidene galactamine to benzaldehyde and D(−)galactamine. The D(−)galactamine employed by Roux was prepared by the sodium-amalgam reduction of D(+)galactose oxime.

The present process has definite advantages over the prior art and more particularly over the work reported by Roux. The present process is adapted to the utilization of impure D(−)galactamine prepared by any known procedure, and particularly to D(−)galactamine produced by reacting D(+)galactose with ammonia in the presence of hydrogen and a hydrogenation catalyst. In contrast to the Roux process, the reaction between the aromatic aldehyde and impure D(−)galactamine in the present process can be conducted at much lower temperatures, thus minimizing the possibility of by-product formation. In addition the aldehydegalactamines in the present process precipitate directly from the reaction mixture as formed, so that precipitating agents are not required. Furthermore, the overall process is considerably shorter and results in the production of crystalline D(−)galactamine of excellent purity.

In the present process aromatic aldehydes which can be employed include such aldehydes as benzaldehyde, salicylaldehyde, 4-hydroxybenzaldehyde, 2,4-dihydroxybenzaldehyde, furfural, 3-methoxy-4-hydroxybenzaldehyde (vanillin), 4-nitrobenzaldehyde, cinnamaldehyde, terephthalaldehyde, 2-hydroxy-4-chlorobenzaldehyde, piperonal, 4-methoxybenzaldehyde, 2-hydroxy-3-methoxybenzaldehyde, and the like.

In carrying out the process of the present invention an aromatic aldehyde is reacted, preferably with agitation, with crude D(−)galactamine in an inert solvent to produce an aldehydegalactamine. The inert solvent can be added either with the aldehyde or with the crude D(—)galactamine, or with both, or can be added independently to an unreacted mixture of the aldehyde and the crude D(—)galactamine. Inert solvents which can be employed include water, and inert organic solvents, e. g., chlorinated hydrocarbons such as carbon tetrachloride, ethylene dichloride, methylene chloride, and the like, aromatic hydrocarbons such as benzene, toluene, xylene, and the like, aliphatic hydrocarbons such as heptane, hexane, pentane, petroleum ether, and the like, lower-aliphatic alcohols such as methanol, ethanol, isopropanol, butanol, and the like, lower-aliphatic ketones such as acetone, diethyl ketone, methyl isobutyl ketone, ethyl methyl ketone, and the like, lower-aliphatic ethers such as diethyl ether, diisopropyl ether, dibutyl ether, and the like, and heterocyclic ethers such as dioxan, and the like, with water ordinarily being preferred. The aldehyde-galactamines by virtue of their low solubility in water and organic solvents such as those exemplified above, precipitate directly from the reaction mixture as they are formed and can be recovered by conventional means, such as filtration. The reaction is advantageously carried out at a temperature between about zero degrees centigrade and about eighty degrees centigrade but the preferred range is between about 20 degrees centigrade and about 60 degrees centigrade. The reaction time is preferably between about five minutes and about thirty minutes, such as about ten minutes at 25 degrees centigrade. The recovered aldehyde-galactamine product can be washed, if desired, with water or an organic solvent, such as exemplified above.

The aldehyde-galactamine is thereupon hydrolyzed to the corresponding aldehyde and purified D(—)galactamine, and the latter is separated from the reaction mixture. In most instances the rate of hydrolysis is undesirably slow in the absence of an acid catalyst. Generally speaking, therefore, it is preferred to hydrolyze the aldehyde-galactamine with water in the presence of an acid catalyst such as hydrogen chloride, sulfuric acid, paratoluenesulfonic acid, and the like, such hydrolyses being suitably carried out at temperatures ranging between about eighty and about 100 degrees centigrade. When an acid catalyst is employed, the D(—)galactamine produced by hydrolysis will be present in the reaction mixture as the acid addition salt corresponding to the particular acid used. In such cases, it is preferred to free the reaction mixture of the aldehyde produced by hydrolysis, by steam distillation if the aldehyde is sufficiently volatile, or by extracting the reaction mixture with any suitable immiscible solvent, e. g., a chlorinated hydrocarbon such as methylene chloride. The resulting mixture, free from aldehyde, can then be concentrated, and a lower-aliphatic alcohol added to precipitate the D(—)-galactamine acid addition salt. The D(—)galactamine acid addition salt can be deacidified by conventional procedure, e. g., adding an alkali such as an aqueous solution of an alkali or alkaline earth hydroxide to the acid addition salt, concentrating the mixture, and recovering the purified D(—)galactamine. The purified D(—)galactamine can also be recovered by passing an aqueous solution of the acid addition salt through an anion exchange resin column.

In some instances, particularly in the case of benzylidene galactamine, the hydrolysis can be satisfactorily conducted in the absence of catalyst. Thus the recovery of D(—)galactamine from benzylidene galactamine can be accomplished simply and effectively by heating with water at a temperature between about eighty and about 100 degrees centigrade, removing the released benzaldehyde by steam distillation, and concentrating the reaction mixture. The reaction mixture can be completely concentrated to dryness to produce purified D(—)galactamine, or partially concentrated and a lower-aliphatic alcohol added thereto to precipitate the purified D(—)galactamine.

The following examples are illustrative of the process and products of the present invention but are not to be construed as limiting.

*Example 1.—Preparation of purified D(—)galactamine*

A. PREPARATION OF CRUDE D(—)GALACTAMINE

D(+)galactose (150 grams, 0.829 mole) was placed in a one-liter autoclave which was covered with a rubber dam and cooled in a Dry-Ice chest overnight. Four teaspoons of Raney nickel catalyst, washed three times with absolute ethanol, were added to the autoclave with 9.6 milliliters (three percent by weight based on ammonia subsequently added) of water, and cooling was continued for an additional thirty minutes. Liquid ammonia (400 milliliters) was condensed in a glass tube plugged with cotton and the liquid was carefully added to the and the pressure was 1750 pounds per square inch. Hydrogen was added to a pressure of 1250 pounds per square inch, the stirrer was started, and heat was applied. In one hour the temperature reached 85 degrees centigrade and the pressure was 1750 pounds per square nich. Hydrogenation at 85 degrees centigrade was carried out for three hours, at which time the pressure had dropped to 1250 pounds per square inch. The system was vented and the contents of the reactor were removed immediately with the aid of hot water. The purple hydrogenation mixture, after removal of the catalyst by filtration, was concentrated under reduced pressure until the odor of ammonia was no longer apparent.

B. PREPARATION OF SALICYLIDENE GALACTAMINE

The concentrate from Step A, substantially ammonia-free, was made up to 750 milliliters with water and placed in a flask equipped with a stirrer and a nitrogen inlet. Salicylaldehyde (103 grams, 0.844 mole) was added with stirring, and the mixture was stirred for ten minutes while being cooled in an ice bath. The yellow, solid salicylidene galactamine thus produced was removed by filtration, and washed on the filter with 100 milliliters of ice water. After drying in a vacuum oven at fifty degrees centigrade for about twenty hours, the yield of salicylidene galactamine was 191.7 grams [81 percent based on the starting D(+)galactose], melting point 189 to 195 degrees centigrade with sintering at 175 degrees centigrade.

The crude salicylidene galactamine (159 grams) was placed in a three-necked flask equipped with a stirrer, stirred with 400 milliliters of ether for five minutes, washed onto a filter with an additional 250 milliliters of ether, and then air-dried under a heat lamp. There was thus obtained 146 grams of purified salicylidene galactamine (92 percent recovery based on the crude), having a melting point of 196 to 198 degrees centigrade. The overall yield of purified salicylidene galactamine was 74 percent based on D(+)galactose.

In a three-necked flask equipped with a mechanical stirrer was placed 145.5 grams (0.511 mole) of purified salicylidene galactamine from Step B, one liter of water, and ninety milliliters of concentrated hydrochloric acid. The reaction mixture was stirred vigorously on a steam bath for fifteen minutes. It was then cooled to room temperature and extracted with three 125-milliliter portions of methylene chloride to remove salicylaldehyde. The aqueous phase was concentrated to dryness and the residual solid was triturated with 400 milliliters of ethanol. After filtration, the galactamine hydrochloride thus obtained was dried in a vacuum oven at fifty degrees centigrade.

D. PURIFIED D(—)GALACTAMINE

The galactamine hydrochloride from Step C was dissolved in two liters of deionized water and the solution was passed through an anion exchange resin bed (hydroxide cycle), dimensions 1.625 inches by 30.5 inches, at a rate of ten to fifteen milliliters per minute. The column was flushed with 3000 milliliters of water to rinse the galactamine through the column. The colorless effluent was concentrated under reduced pressure (twenty millimeters of mercury) on a steam bath to a volume of 200 milliliters. Ethanol was added to bring the volume to one liter and the suspension of galactamine in aqueous ethanol was cooled at three degrees centigrade overnight. The solid, purified D(—)galactamine, was removed by filtration, and dried in a vacuum oven at fifty degrees centigrade for 24 hours. This product weighed 78 grams, an 84 percent yield based on salicylidene galactamine and a 63 percent overall yield based on D(+)-galactose. The purified compound had a melting point of 145 to 148 degrees centigrade, a specific rotation in water of minus one degree, and had the following analysis:

Analysis.—Calculated for $C_6H_{15}NO_5$: C, 39.77; H, 8.34; N, 7.73; neutral equivalent 181.2; Van Slyke N, 7.73. Found: C, 39.43; H, 8.65; N, 7.29; neutral equivalent 183.5; Van Slyke N, 8.0.

*Example 2.—Preparation of purified D(—)galactamine*

A. PREPARATION OF CRUDE D(—)GALACTAMINE

Crude D(—)galactamine was prepared in essentially the same manner as disclosed in Step A of Example 1 and the concentrate was made up to 1000 milliliters with water.

B. PREPARATION OF BENZYLIDENE GALACTAMINE

A 500-milliliter aliquot from Step A was transferred to a three-necked flask equipped with a stirrer and 48 grams (0.453 mole) of benzaldehyde was added. The reaction mixture was stirred rapidly for a few minutes at which point it set up to a solid mass. The reaction vessel was then cooled with ice water, 200 milliliters of water was added, and stirring was continued for ten minutes. The solid benzylidene galactamine was removed by filtration and washed on the filter with 250 milliliters of ice water. The crude product was reslurried in about 500 milliliters of ice water and refiltered. It was then slurried in 500 milliliters of methanol, filtered, washed on the filter with 500 milliliters of ether, and dried in a vacuum oven at fifty degrees centigrade. The yield of benzylidene galactamine thus obtained was 68.5 grams [62 percent based on D(+)galactose], melting point 192 to 193 degrees centigrade.

Analysis.—Calculated for $C_{13}H_{19}NO_5$: C, 57.98; H, 7.11; N, 5.20. Found: C, 57.71; H, 6.91; N, 5.61.

C. HYDROLYSIS OF BENZYLIDENE GALACTAMINE

In a two-liter, three-necked flask outfitted for steam distillation, and fitted with a mechanical stirrer and a nitrogen inlet, were placed 26.9 grams (0.1 mole) of benzylidene galactamine from Step B and 500 milliliters of water. The reaction mixture was stirred and heated to boiling with stirring and steam was passed through the mixture as fast as possible to remove the benzaldehyde as it formed. A total of 250 milliliters of distillate was removed. The aqueous phase remaining in the flask was concentrated to turbidity, diluted to one liter with ethanol, and then cooled at three degrees centigrade for several hours. The white solid, purified D(—)galactamine, was removed by filtration and dried, weighing 13.3 grams (74 percent based on benzylidene galactamine), melting point 144 to 146 degrees centigrade. The filtrate was concentrated to 100 milliliters and a second crop was obtained, 3.3 grams (eighteen percent based on benzylidene galactamine), melting point 146 to 148 degrees centigrade. The overall yield of D(—)galactamine from D(+)galactose was 57 percent.

*Example 3.—Preparation of salicylidene galactamine*

To a stirred solution of the remaining 500-milliliter aliquot from Example 2, Step A, was added 55.0 grams (0.45 mole) of salicylaldehyde. Stirring was continued for ten minutes at room temperature, and then for an additional five minutes while cooling with ice water. The yellow, solid salicylidene galactamine was removed by filtration and reslurried in 300 milliliters of water. After filtration, the solid was slurried in 300 milliliters of methanol, refiltered, and washed on the filter with ether. The dried salicylidene galactamine weighed 78.2 grams [66 percent based on D(+)galactose] and melted at 200 to 202 degrees centigrade.

Analysis.—Calculated for $C_{13}H_{19}NO_6$: C, 54.73; H, 6.71; N, 4.91. Found: C 54.94; H, 7.09; N, 4.75.

*Example 4.—Preparation of purified D(—)galactamine*

A. PREPARATION OF BENZYLIDENE GALACTAMINE

In a 500-milliliter, three-necked, round-bottom flask equipped with a stirrer, condenser, and a nitrogen inlet, were placed 15 grams of crude galactamine, 50 milliliters of absolute methanol, and 10.1 milliliters of benzaldehyde. The reaction mixture was heated to reflux with stirring for ten minutes and the resulting white powdery solid was removed by filtration at about fifty degrees centigrade. The solid was washed on the filter with methanol at 25 degrees centigrade and with dry ether until the odor of benzaldehyde was no longer apparent. The white powder was dried in a vacuum oven at 50 degrees centigrade to yield 14.5 grams of benzylidene galactamine which melted at 189–191 degrees centigrade.

B. HYDROLYSIS OF BENZYLIDENE GALACTAMINE

The benzylidene galactamine from Step A was placed in a three-necked flask equipped with a stirrer, a nitrogen inlet, and a condenser set downward for distillation. Water (220 milliliters) was added and the reaction mixture was stirred. Heat was applied until the water was distilling at a rapid rate, and the distillation was continued until the distillate was free of benzaldehyde. The aqueous solution remaining in the flask was concentrated under reduced pressure to a paste, 150 milliliters of absolute ethanol was added, and about 50 milliliters of liquid was distilled under reduced pressure. On standing for two days the mixture produced a crop of white crystals which was removed by filtration, washed with absolute ethanol, and dried in a vacuum oven at 50 degrees centigrade to yield 5.1 grams [34.0 percent based on impure D(—)galactamine] of purified D(—)galactamine which melted at 149–151 degrees centigrade, had a neutral equivalent of 186 (methyl red indicator), a specific rotation in water of minus 2 degrees, and the following elemental analysis: C, 40.29; H, 8.47; N, 7.33; Van Slyke N, 7.41.

*Example 5.—Preparation of purified D(—)galactamine*

In the same manner as disclosed in Example 1, furfurylidene galactamine was prepared by utilizing furfural instead of salicylaldehyde. This produce melted between 181–183 degrees centigrade with decomposition and had the following analysis:

Analysis.—Calculated for $C_{11}H_{17}NO_6$: C, 50.95; H, 6.61; N, 5.50. Found: C, 50.85; H, 6.52; N, 5.37.

The furfurylidene galactamine was hydrolyzed in the same manner as the salicylidene galactamine of Example 1 to produce purified D(—)galactamine.

*Example 6.—Preparation of purified D(—)galactamine*

In the same manner as disclosed in Example 1, except for the substitution of 2-hydroxy-3-methoxybenzaldehyde for salicylaldehyde, 2 - hydroxy - 3 - methoxybenzylidene galactamine was prepared and hydrolyzed to produce purified D(—)galactamine.

*Example 7.—Preparation of purified D(—)galactamine*

In the same manner as disclosed in Example 1, except for the substitution of cinnamaldehyde for salicylaldehyde, cinnamylidene galactamine was prepared and hydrolyzed to produce purified D(—)galactamine.

*Example 8.—Preparation of purified D(—)galactamine*

In the same manner as disclosed in Example 1, except for the substitution of piperonal for salicylaldehyde, piperonylidene galactamine was prepared and hydrolyzed to produce purified D(—)galactamine.

*Example 9.—Preparation of purified D(—)galactamine*

In the same manner as disclosed in Example 1, except for the substitution of 4-hydroxybenzaldehyde for salicylaldehyde, 4-hydroxybenzylidene galactamine was prepared and hydrolyzed to produced purified D(—)galactamine.

*Example 10.—Preparation of purified D(—)galactamine*

In the same manner as disclosed in Example 1, except for substituting 2,4-dihydroxybenzaldehyde for salicylaldehyde and employing methylene chloride as the inert solvent, 2,4-dihydroxybenzylidene galactamine was prepared and hydrolyzed to produce purified D(—)galactamine.

*Example 11.—Preparation of purified D(—)galactamine*

In the same manner as disclosed in Example 1, except for substituting vanillin for salicylaldehyde and employing ethanol as the inert solvent, 3-methoxy-4-hydroxybenzylidene galactamine was prepared and hydrolyzed to produce purified D(—)galactamine.

*Example 12.—Preparation of purified D(—)galactamine*

In the same manner as disclosed in Example 1, except for substituting 4-nitrobenzaldehyde for salicylaldehyde and employing diethyl ketone as the inert solvent, 4-nitrobenzylidene galactamine was prepared and hydrolyzed to produce purified D(—)galactamine.

*Example 13.—Preparation of purified D(—)galactamine*

In the same manner as disclosed in Example 1, except for the substitution of terephthalaldehyde for salicylaldehyde, terephthalylidene bis(galactamine) was prepared and hydrolyzed to produce purified D(—)galactamine.

*Example 14.—Preparation of purified D(—)galactamine*

In the same manner as disclosed in Example 1, except for the substitution of 2-hydroxy-4-chlorobenzaldehyde for salicylaldehyde, 2-hydroxy-4-chlorobenzylidene galactamine was prepared and hydrolyzed to produce purified D(—)galactamine.

*Example 15.—Preparation of purified D(—)galactamine*

In the same manner as disclosed in Example 1, except for the substitution of 4-methoxybenzaldehyde for salicylaldehyde, 4-methoxybenzylidene galactamine was prepared and hydrolyzed to produce purified D(—)galactamine.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. In a process for the purification of D(—)galactamine, the steps of reacting crude D(—)galactamine with an aromatic aldehyde in the presence of an inert solvent at a temperature between about zero degrees centigrade and about 80 degrees centigrade, separating the resulting aldehyde-galactamine, and hydrolyzing the aldehyde-galactamine to produce purified D(—)galactamine.

2. In a process for the purification of D(—)galactamine, the steps of reacting crude D(—)galactamine with an aromatic aldehyde in the presence of an inert solvent at a temperature between about 20 degrees centigrade and about 60 degrees centigrade, separating the resulting aldehyde-galactamine, and hydrolyzing the aldehyde-galactamine to produce purified D(—)galactamine.

3. In a process for the purification of D(—)galactamine, the steps of reacting crude D(—)galactamine with an aromatic aldehyde in the presence of water and at a temperature between about 20 degrees centigrade and about 60 degrees centigrade, separating the resulting aldehyde-galactamine, and hydrolyzing the aldehyde-galactamine to product purified D(—)galactamine.

4. In a process for the purification of D(—)galactamine, the steps of reacting crude D(—)galactamine with an aromatic aldehyde in the presence of an inert organic solvent at a temperature between about 20 degrees centigrade and about 60 degrees centigrade, separating the resulting aldehyde-galactamine, and hydrolyzing the aldehyde-galactamine to produce purified D(—)galactamine.

5. In a process for preparing D(—)galactamine from D(+)galactose, the steps of reacting D(+)galactose with hydrogen and ammonia in the presence of a catalyst to produce crude D(—) galactamine, reacting the crude D(—) galactamine thus obtained with an aromatic aldehyde in the presence of an inert solvent and at a temperature between about zero degrees centigrade and about 80 degrees centigrade, separating the resulting aldehyde-galactamine, and hydrolyzing the aldehyde-galactamine.

6. In a process for preparing D(—)galactamine from D(+)galactose, the steps of reacting D(+)galactose with hydrogen and ammonia in the presence of a catalyst to produce crude D(—)galactamine, reacting the crude D(—)galactamine thus obtained with an aromatic aldehyde in the presence of an inert solvent and at a temperature between about 20 degrees centigrade and about 60 degrees centigrade, separating the resulting aldehyde-galactamine, and hydrolyzing the aldehyde-galactamine.

7. In a process for preparing D(—)galactamine from D(+)galactose, the steps of reacting D(+)galactose with hydrogen and ammonia in the presence of a catalyst to produce crude D(—)galactamine, reacting the crude D(—)galactamine thus obtained with an aromatic aldehyde in the presence of water and at a temperature between about 20 degrees centigrade and about 60 degrees centigrade, separating the resulting aldehyde-galactamine, and hydrolyzing the aldehyde-galactamine.

8. In a process for preparing D(—)galactamine from D(+)galactose, the steps of reacting D(+)galactose with hydrogen and ammonia in the presence of a catalyst to produce crude D(—)galactamine, reacting the crude D(—)galactamine thus obtained with an aromatic aldehyde in the presence of an inert organic solvent at a temperature between about 20 degrees centigrade and about 60 degrees centigrade, separating the resulting aldehyde-galactamine, and hydrolyzing the aldehyde-galactamine.

9. In a process for preparing D(—) galactamine from D(+) galactose, the steps of reacting D(+)galactose with hydrogen and ammonia in the presence of a nickel catalyst to produce crude D(—)galactamine, reacting an aqueous solution of the crude D(—)galactamine thus obtained with furfural, separating the resulting furfurylidene galactamine, and hydrolyzing the furfurylidene galactamine to produce purified D(—)galactamine.

10. In a process for preparing D(—)galactamine from D(+)galactose, the steps of reacting D(+)galactose with hydrogen and ammonia in the presence of a nickel catalyst to produce crude D(—)galactamine, reacting an aqueous solution of the crude D(—)galactamine thus obtained with salicylaldehyde, separating the resulting salicylidene galactamine, and hydrolyzing the salicylidene galactamine to produce purified D(—)galactamine.

11. A process for the purification of D(—)galactamine comprising the steps of reacting an aqueous solution of crude D(—) galactamine with salicylaldehyde at a temperature between about 20 degrees centigrade and about 60 degrees centigrade to produce salicylidene galactamine, hydrolyzing the resulting product with water and an acid hydrolyzing agent to produce a D(—)galactamine acid addition salt, and passing the resulting D(—)galactamine acid addition salt through an anion exchange column to produce purified D(—)galactamine.

12. A process for the purification of D(—)galactamine comprising the steps of reacting an aqueous solution of crude (D)galactamine with benzaldehyde at a temperature between about 20 degrees centigrade and about 60 degrees centigrade to produce benzylidene galactamine, hydrolyzing the benzylidene galactamine, steam distilling the hydrolyzed product to remove the benzaldehyde, and concentrating the remaining mixture to produce purified D(—)galactamine.

References Cited in the file of this patent

UNITED STATES PATENTS 2,396,097    Gubelmann _____ Mar. 5, 1946

OTHER REFERENCES

Roux: "Annales de Chimie et de Physique," volume (8) I 142, page 142, 1904.

Anderson et al.: "J. A. C. S." 1950, volume 72, pages 3141 to 3145.